United States Patent
Seo et al.

(10) Patent No.: US 7,840,121 B2
(45) Date of Patent: Nov. 23, 2010

(54) RECORDING MEDIUM HAVING DATA STRUCTURE FOR MANAGING REPRODUCTION OF MULTIPLE GRAPHICS STREAMS RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1353 days.

(21) Appl. No.: 10/682,881

(22) Filed: Oct. 14, 2003

(65) Prior Publication Data
US 2004/0096191 A1    May 20, 2004

(30) Foreign Application Priority Data
Oct. 15, 2002    (KR) .................. 10-2002-0062940

(51) Int. Cl.
*H04N 5/00*    (2006.01)
(52) U.S. Cl. .............. 386/126; 386/123; 386/124; 386/125; 386/112
(58) Field of Classification Search ......... 386/111–112, 386/69, 45, 95, 126, 125, 123, 124
See application file for complete search history.

(56) References Cited

U.S. PATENT DOCUMENTS

| | | | |
|---|---|---|---|
| 5,280,572 A * | 1/1994 | Case et al. ............. 369/47.16 | |
| 5,521,898 A | 5/1996 | Ogasawara | |
| 5,583,652 A | 12/1996 | Ware | |
| 5,602,956 A | 2/1997 | Suzuki et al. | |
| 5,630,006 A | 5/1997 | Hirayama et al. | |
| 5,633,839 A | 5/1997 | Alexander et al. | |
| 5,691,972 A | 11/1997 | Tsuga et al. | |
| 5,703,997 A | 12/1997 | Kitamura et al. | |
| 5,734,788 A | 3/1998 | Nonomura et al. | |
| 5,742,569 A | 4/1998 | Yamamoto et al. | |
| 5,784,528 A | 7/1998 | Yamane et al. | |
| 5,884,004 A | 3/1999 | Sato et al. | |
| 5,913,010 A * | 6/1999 | Kaneshige et al. ............ 386/70 |
| 5,917,781 A | 6/1999 | Kim | |
| 5,923,869 A | 7/1999 | Kashiwagi et al. | |

(Continued)

FOREIGN PATENT DOCUMENTS

CN    1163673    10/1997

(Continued)

OTHER PUBLICATIONS

Canadian Office Action dated Jan. 24, 2006.

(Continued)

*Primary Examiner*—Thai Tran
*Assistant Examiner*—Helen Shibru
(74) *Attorney, Agent, or Firm*—Harness, Dickey & Pierce, P.L.C.

(57) ABSTRACT

The recording medium includes a data area storing at least multiple graphics streams in at least one portion thereof. The multiple graphics streams are multiplexed, and each graphics stream is a transport stream stored as one or more packets. Each packet has a packet identifier, and the packets of the same graphics stream have the same packet identifier.

19 Claims, 6 Drawing Sheets

U.S. PATENT DOCUMENTS

| | | | |
|---|---|---|---|
| 5,933,410 A | 8/1999 | Nakane et al. | |
| 5,953,290 A | 9/1999 | Fukuda et al. | |
| 5,999,694 A | 12/1999 | Yasuda et al. | |
| 5,999,698 A | 12/1999 | Nakai et al. | |
| 6,009,234 A | 12/1999 | Taira et al. | |
| 6,014,495 A | 1/2000 | Moriyama et al. | |
| 6,064,385 A | 5/2000 | Sturgeon et al. | |
| 6,064,796 A | 5/2000 | Nakamura et al. | |
| 6,067,400 A | 5/2000 | Saeki et al. | |
| 6,084,581 A | 7/2000 | Hunt | |
| 6,097,676 A | 8/2000 | Fujinami | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,215,746 B1 | 4/2001 | Ando et al. | |
| 6,219,488 B1 | 4/2001 | Mori et al. | |
| 6,222,805 B1 | 4/2001 | Mori et al. | |
| 6,247,022 B1 | 6/2001 | Yankowski | |
| 6,285,825 B1 | 9/2001 | Miwa et al. | |
| 6,292,226 B1 | 9/2001 | Yamanaka et al. | |
| 6,308,005 B1 | 10/2001 | Ando et al. | |
| 6,321,027 B2 | 11/2001 | Honjo | |
| 6,336,002 B1 | 1/2002 | Yamauchi et al. | |
| 6,356,971 B1 | 3/2002 | Katz et al. | |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,385,388 B1 | 5/2002 | Lewis et al. | |
| 6,392,969 B1 | 5/2002 | Heo | |
| 6,393,430 B1 | 5/2002 | Van Ryzin | |
| 6,415,101 B1 | 7/2002 | DeCarmo et al. | |
| 6,424,793 B1 | 7/2002 | Setogawa et al. | |
| 6,424,797 B1 | 7/2002 | Murase et al. | |
| 6,532,334 B1 | 3/2003 | Kikuchi et al. | |
| 6,570,837 B1 | 5/2003 | Kikuchi et al. | |
| 6,580,870 B1 | 6/2003 | Kanazawa et al. | |
| 6,584,277 B2 | 6/2003 | Tsumagari et al. | |
| 6,615,192 B1 | 9/2003 | Tagawa et al. | |
| 6,647,496 B1 | 11/2003 | Tagawa et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 | 8/2004 | Tanaka et al. | |
| 6,795,499 B1 | 9/2004 | Kato et al. | |
| 6,798,981 B1 | 9/2004 | Yamauchi et al. | |
| 6,832,293 B1 | 12/2004 | Tagawa et al. | |
| 6,859,421 B2 | 2/2005 | Sawabe et al. | |
| 6,904,227 B1 | 6/2005 | Yamamoto et al. | |
| 6,912,218 B1 | 6/2005 | Jeon | |
| 6,914,863 B2 | 7/2005 | Ono | |
| 6,965,727 B1 | 11/2005 | Sawabe et al. | |
| 6,999,674 B1 | 2/2006 | Hamada et al. | |
| 7,006,758 B1 | 2/2006 | Yamamoto et al. | |
| 7,050,384 B2 | 5/2006 | Sasaki | |
| 7,065,287 B1 | 6/2006 | Heredia et al. | |
| 7,113,694 B2 | 9/2006 | Kim et al. | |
| 7,236,687 B2 | 6/2007 | Kato et al. | |
| 2001/0014070 A1 | 8/2001 | Ando et al. | |
| 2001/0026679 A1 | 10/2001 | Koshino et al. | |
| 2001/0030710 A1* | 10/2001 | Werner | 348/467 |
| 2001/0036358 A1 | 11/2001 | Kim et al. | |
| 2001/0043790 A1 | 11/2001 | Saeki et al. | |
| 2001/0053280 A1 | 12/2001 | Yamauchi et al. | |
| 2002/0018416 A1 | 2/2002 | Heo | |
| 2002/0041557 A1 | 4/2002 | Heo | |
| 2002/0046328 A1 | 4/2002 | Okada | |
| 2002/0093556 A1 | 7/2002 | Ishizawa et al. | |
| 2002/0093886 A1 | 7/2002 | Ijichi et al. | |
| 2002/0106196 A1* | 8/2002 | Yamauchi et al. | 386/95 |
| 2002/0126994 A1 | 9/2002 | Gunji et al. | |
| 2002/0129036 A1 | 9/2002 | Ho Yuen Lok et al. | |
| 2002/0135608 A1 | 9/2002 | Hamada et al. | |
| 2002/0145702 A1* | 10/2002 | Kato et al. | 352/1 |
| 2002/0159368 A1 | 10/2002 | Noda et al. | |
| 2002/0177914 A1 | 11/2002 | Chase | |
| 2002/0180803 A1 | 12/2002 | Kaplan et al. | |
| 2003/0035684 A1 | 2/2003 | Hutter | |
| 2003/0058948 A1 | 3/2003 | Kelly et al. | |
| 2003/0103604 A1 | 6/2003 | Kato et al. | |
| 2003/0118327 A1 | 6/2003 | Um et al. | |
| 2003/0123346 A1 | 7/2003 | Ishii et al. | |
| 2003/0123845 A1 | 7/2003 | Koda et al. | |
| 2003/0147322 A1 | 8/2003 | Ono | |
| 2003/0161615 A1 | 8/2003 | Tsumagari et al. | |
| 2003/0235404 A1 | 12/2003 | Seo et al. | |
| 2004/0014136 A1 | 1/2004 | Ishii et al. | |
| 2004/0019396 A1 | 1/2004 | McMahon et al. | |
| 2004/0047588 A1 | 3/2004 | Okada et al. | |
| 2004/0047591 A1 | 3/2004 | Seo et al. | |
| 2004/0076402 A1 | 4/2004 | Jung et al. | |
| 2004/0114908 A1 | 6/2004 | Ito | |
| 2004/0156621 A1 | 8/2004 | Seo et al. | |
| 2004/0208135 A1 | 10/2004 | Nakamura et al. | |
| 2004/0213105 A1 | 10/2004 | Seo et al. | |
| 2004/0220791 A1 | 11/2004 | Lamkin et al. | |
| 2005/0019007 A1 | 1/2005 | Kato et al. | |
| 2005/0025459 A1 | 2/2005 | Kato et al. | |
| 2005/0036763 A1 | 2/2005 | Kato et al. | |
| 2006/0013564 A1 | 1/2006 | Hamada et al. | |
| 2006/0110132 A1 | 5/2006 | Takakuwa et al. | |
| 2006/0222340 A1 | 10/2006 | Yamauchi et al. | |
| 2007/0206932 A1* | 9/2007 | Kato | 386/111 |

FOREIGN PATENT DOCUMENTS

| | | |
|---|---|---|
| CN | 1205793 | 1/1999 |
| CN | 1212427 | 3/1999 |
| CN | 1220458 | 6/1999 |
| CN | 1235974 | 12/1999 |
| CN | 1251680 | 4/2000 |
| CN | 1263345 | 8/2000 |
| CN | 1272209 | 11/2000 |
| CN | 1310445 | 8/2001 |
| CN | 1317200 | 10/2001 |
| CN | 1320926 | 11/2001 |
| CN | 1346491 | 4/2002 |
| CN | 1364387 | 8/2002 |
| CN | 1383679 | 12/2002 |
| CN | 1393872 | 1/2003 |
| CN | 1509572 | 6/2004 |
| CN | 1555058 | 12/2004 |
| CN | 1571055 | 1/2005 |
| CN | 1606355 | 4/2005 |
| CN | 1606356 | 4/2005 |
| CN | 1606357 | 4/2005 |
| CN | 1611071 | 4/2005 |
| EP | 0723216 | 7/1996 |
| EP | 0724264 | 7/1996 |
| EP | 0737009 | 10/1996 |
| EP | 0831647 | 3/1998 |
| EP | 0836183 | 4/1998 |
| EP | 0836189 | 4/1998 |
| EP | 0858073 | 8/1998 |
| EP | 0872839 | 10/1998 |
| EP | 0949622 | 10/1999 |
| EP | 1024494 | 8/2000 |
| EP | 1050880 | 11/2000 |
| EP | 1103974 | 5/2001 |
| EP | 1126454 | 8/2001 |
| EP | 1041565 | 9/2001 |
| EP | 1148503 | 10/2001 |

| | | |
|---|---|---|
| EP | 1041569 | 1/2002 |
| EP | 1198132 | 4/2002 |
| EP | 1198133 | 4/2002 |
| EP | 1205933 | 5/2002 |
| EP | 1271526 | 1/2003 |
| EP | 1280348 | 1/2003 |
| EP | 1398965 | 3/2004 |
| EP | 1469677 | 10/2004 |
| EP | 1391119 | 6/2006 |
| JP | 08-273304 A | 10/1996 |
| JP | 09-135421 | 5/1997 |
| JP | 10-032780 | 2/1998 |
| JP | 10-040667 | 2/1998 |
| JP | 11-069308 | 3/1999 |
| JP | 11-069309 | 3/1999 |
| JP | 11-096653 | 4/1999 |
| JP | 11-120747 | 4/1999 |
| JP | 11-161663 | 6/1999 |
| JP | 11-213522 | 8/1999 |
| JP | 11-213627 A | 8/1999 |
| JP | 11-259985 | 9/1999 |
| JP | 11-296997 | 10/1999 |
| JP | 2000-021130 A | 1/2000 |
| JP | 2000-067522 A | 3/2000 |
| JP | 2000-149405 A | 5/2000 |
| JP | 2000-195235 A | 7/2000 |
| JP | 2000-222822 | 8/2000 |
| JP | 2000-235779 | 8/2000 |
| JP | 2000-235780 | 8/2000 |
| JP | 2000-322827 | 11/2000 |
| JP | 2000-331466 | 11/2000 |
| JP | 2000-348442 | 12/2000 |
| JP | 2001-024985 A | 1/2001 |
| JP | 2001-157145 | 6/2001 |
| JP | 2001-157208 | 6/2001 |
| JP | 2001-169246 | 6/2001 |
| JP | 3199243 | 6/2001 |
| JP | 3199711 B2 | 6/2001 |
| JP | 2001/195809 | 7/2001 |
| JP | 2001-332006 | 11/2001 |
| JP | 2001/359072 | 12/2001 |
| JP | 2002-025231 | 1/2002 |
| JP | 2002-082838 A | 3/2002 |
| JP | 2002-083486 A | 3/2002 |
| JP | 2002-112201 | 4/2002 |
| JP | 2002-150685 | 5/2002 |
| JP | 2002-158972 | 5/2002 |
| JP | 2002-158974 A | 5/2002 |
| JP | 2002-222581 | 8/2002 |
| JP | 2002-251328 | 9/2002 |
| JP | 2002-281463 | 9/2002 |
| JP | 2002/352515 | 12/2002 |
| JP | 3379961 | 12/2002 |
| JP | 3392838 | 1/2003 |
| JP | 3392849 | 1/2003 |
| JP | 2003/068057 | 3/2003 |
| JP | 2003-199047 | 7/2003 |
| JP | 2003-520514 | 7/2003 |
| JP | 2004-127397 | 4/2004 |
| JP | 2005-513936 | 5/2005 |
| JP | 2005/251392 | 9/2005 |
| KR | 1996-0038743 | 11/1996 |
| KR | 1996-0038744 | 11/1996 |
| KR | 1996-0038901 | 11/1996 |
| KR | 1996-0038905 | 11/1996 |
| KR | 1999-0022858 | 3/1999 |
| KR | 1999-0079482 | 5/1999 |
| KR | 2000-0053633 | 8/2000 |
| KR | 2001-0022702 | 3/2001 |
| KR | 2001-0028735 | 4/2001 |
| KR | 2001-0051898 | 6/2001 |
| KR | 2001-0098007 | 11/2001 |
| KR | 2001-0107578 | 12/2001 |
| KR | 2002-0006273 | 1/2002 |
| KR | 2002-0020919 | 3/2002 |
| KR | 2002-0097454 | 12/2002 |
| KR | 2002-0097455 | 12/2002 |
| RU | 2163057 | 2/2001 |
| WO | WO 97/06635 | 2/1997 |
| WO | WO 97/13366 | 4/1997 |
| WO | WO 97/14151 A1 | 4/1997 |
| WO | WO 97/15924 | 5/1997 |
| WO | WO 97/37491 | 10/1997 |
| WO | WO 97/38527 | 10/1997 |
| WO | WO 97/39451 | 10/1997 |
| WO | WO 99/08281 | 2/1999 |
| WO | WO 99/38169 | 7/1999 |
| WO | WO 00/46803 | 8/2000 |
| WO | WO 00/60597 | 10/2000 |
| WO | WO 01/35648 | 5/2001 |
| WO | WO 01/52554 | 7/2001 |
| WO | WO 01/82604 | 11/2001 |
| WO | WO 01/82606 | 11/2001 |
| WO | WO 01/82610 | 11/2001 |
| WO | WO 02/075739 | 9/2002 |
| WO | WO 02/080541 | 10/2002 |
| WO | WO 03/047261 | 6/2003 |
| WO | WO 03/058957 | 7/2003 |
| WO | WO 2004/001728 | 12/2003 |
| WO | WO 2004/001750 | 12/2003 |
| WO | WO 2004/001752 | 12/2003 |
| WO | WO 2004/001753 | 12/2003 |
| WO | WO 2004/001754 | 12/2003 |
| WO | WO 2004/032136 | 4/2004 |
| WO | WO 2004/032142 | 4/2004 |
| WO | WO 2004/047100 | 6/2004 |
| WO | WO 2004/088661 | 10/2004 |

OTHER PUBLICATIONS

Canadian Office Action dated Nov. 30, 2007.
International Search Report dated Jan. 30, 2004.
Japanese Patent Office Action dated May 7, 2008, for Japanese Patent Application No. 2004-515203 (4 pp.).
Japanese Patent Office Action dated May 7, 2008, for Japanese Patent Application No. 2004-515199 (4 pp.).
Japanese Patent Office Action dated May 7, 2008, for Japanese Patent Application No. 2004-515216 (2 pp.).
U.S. Patent office Action dated May 21, 2008, for U.S. Appl. No. 10/682,886 (3 pp.).
U.S. Patent Office Action dated May 15, 2008, for U.S. Appl. No. 10/372,226 (3 pp.).
U.S. Patent Office Action dated Apr. 4, 2008, for U.S. Appl. No. 10/787,160 (3 pp.).
Office Action for corresponding Australia Application No. 2003-240036 dated Sep. 11, 2008.
Office Action for corresponding Australia Application No. 2003-228113 dated Sep. 17, 2008.
Office Action for corresponding Japanese Application No. 2004-553264 dated Sep. 16, 2008.
European Search Report for corresponding Application No. 04708081.7-2223 dated Sep. 12, 2008.
Office Action for corresponding Japanese Application No. 2006-502713 dated Jun. 20, 2008.
Office Action for corresponding Japanese Application No. 2006-507790 dated Jun. 24, 2008.
Office Action for Corresponding Japanese Application No. 2006-507735 dated Jun. 27, 2008.
Office Action dated Aug. 18, 2009 by the Japanese Patent Office for a counterpart Japanese application.
Office Action dated Sep. 21, 2009 by the European Patent Office for a counterpart European application.
Office Action dated Jun. 26, 2008 by the Russian Patent Office for a counterpart Russian application.

* cited by examiner

*DVD-ROM*

FIG. 5

*ProgramInfo-Syntax*

```
ProgramInfo(){
    length
    reserved_for_word_align
    number_of_program_sequences
    for(i=0; i<number_of_program_sequence;i++){
        SPN_program_sequence_start[i]
        program_map_PID[i]
        - - - - -
        graphics_PID[I] [stream_index]
        graphicsCodingInfo (i, stream_index)
        graphicsDisplayInfo (i, stream_index)
        - - - - -
    }
```

US 7,840,121 B2

RECORDING MEDIUM HAVING DATA STRUCTURE FOR MANAGING REPRODUCTION OF MULTIPLE GRAPHICS STREAMS RECORDED THEREON AND RECORDING AND REPRODUCING METHODS AND APPARATUSES

FOREIGN PRIORITY

The present invention claims priority under 35 U.S.C. 119 on Korean Application No. 2002-062940 filed Oct. 15, 2002; the contents of the above-cited Korean application is incorporated by reference in its entirety.

BACKGROUND OF THE INVENTION

1. Field of the Invention

The present invention relates to a recording medium having a data structure for managing reproduction of at least multiple graphics streams recorded thereon as well as methods and apparatuses for reproduction and recording.

2. Description of the Related Art

An optical disc such as a DVD (Digital Versatile Disc), capable of recording high quality video and audio data for many hours, is being developed and released to consumer markets. Various types of DVD exist including DVD-ROM and DVD-RW (DVD-Rewritable).

Video and audio streams in a DVD-ROM are recorded in units of a program stream packet defined by the MPEG standard. As shown in FIG. 1, one pack corresponds to a single physical sector with the record size of 2048 bytes.

A single pack is composed of a pack header and includes packets of video, audio, and sub-pictures. The pack header includes pack start code (Pack_start_code), SCR, program mux rate (program_mux_rate), and stuffing length (Stuffing_length).

In a DVD-ROM where a single physical sector corresponds to a single pack in the above-described manner, multiple audio streams may be recorded in a number of respective coding formats in a data area of the DVD-ROM.

As shown in FIG. 2, an optical disc apparatus such as a DVD player may comprise an optical pickup 111, a VDP (Video Disc Play) system 112, a D/A converter 113. The VDP system 112 may comprise a PS DEMUX 120 and a decoding block 121.

The VDP system 112 reads out and plays video and audio streams recorded in the DVD-ROM 110 in units of a program stream packet. The PS DEMUX 120 may output, for example, subtitle data, recorded with main video and audio streams in a part of data area of said DVD-ROM, to the decoding block 121 by demultiplexing in units of a PES (Packetized Elementary Stream).

The decoding block 121 then performs a series of decoding operations on the subtitle data of packetized elementary streams received from the PS DEMUX 120 in order for the subtitle data to be displayed together with the main video, e.g., as a caption overlay.

Accordingly, a user can watch the caption overlay of the subtitle data together with the main video frame.

Recently, standardization of high-density optical discs such as a read-only Blu-ray disc (BD-ROM), which has a higher recording capacity than a DVD, is underway. However, an appropriate method for managing multiple graphics streams for the high-density optical disc has not been established.

SUMMARY OF THE INVENTION

The recording medium according to the present invention includes a data structure for managing reproduction of at least multiple graphics streams recorded on the recording medium.

In one exemplary embodiment, a data area of the recording medium stores at least multiple graphics streams in at least one portion thereof, the multiple graphics streams being multiplexed. Each graphics stream is a transport stream and stored as one or more packets. Each packet has a packet identifier, and the packets of a same graphics stream have a same packet identifier. In one exemplary embodiment, at least one of the multiple graphics streams is a subtitle stream.

According to another exemplary embodiment of the present invention, the recording medium includes a clip information file area having at least one clip information file stored therein. The clip information file includes management information for reproducing multiple graphics streams recorded on the recording medium. For example, the multiple graphics streams are recorded as transport packets, and each transport packet in a same graphics stream has a same packet identifier. The management information identifies each of the multiple graphics streams based on the associated packet identifier. As further examples, the management information indicates the coding and display information for each graphics stream.

According to another exemplary embodiment of the present invention, the recording medium includes a management area having at least one program information field stored therein. Each program information field includes one or more program sequences. Each program sequence is associated with a different segment of at least a graphics presentation and includes management information for managing reproduction of at least one graphics stream in the associated segment. At least one of the program sequences includes management information for multiple graphics streams in the associated segment.

In a further exemplary embodiment, a data area of the recording medium has at least one graphics information packet stored therein. The graphics information packet includes management information for managing reproduction of multiple graphics streams recorded as packets along with the graphics information packet.

The present invention further provides apparatuses and methods for recording and reproducing the data structure according to the present invention, and recording and reproducing multiple audio streams according to the present invention.

BRIEF DESCRIPTION OF THE DRAWINGS

The above features and other advantages of the present invention will be more clearly understood from the following detailed description taken in conjunction with the accompanying drawings, in which:

FIG. 5 illustrates portions of the structure of a program information field recorded on an optical disc according to an embodiment of the present invention;

DESCRIPTION OF THE PREFERRED EMBODIMENTS

Figure 6:
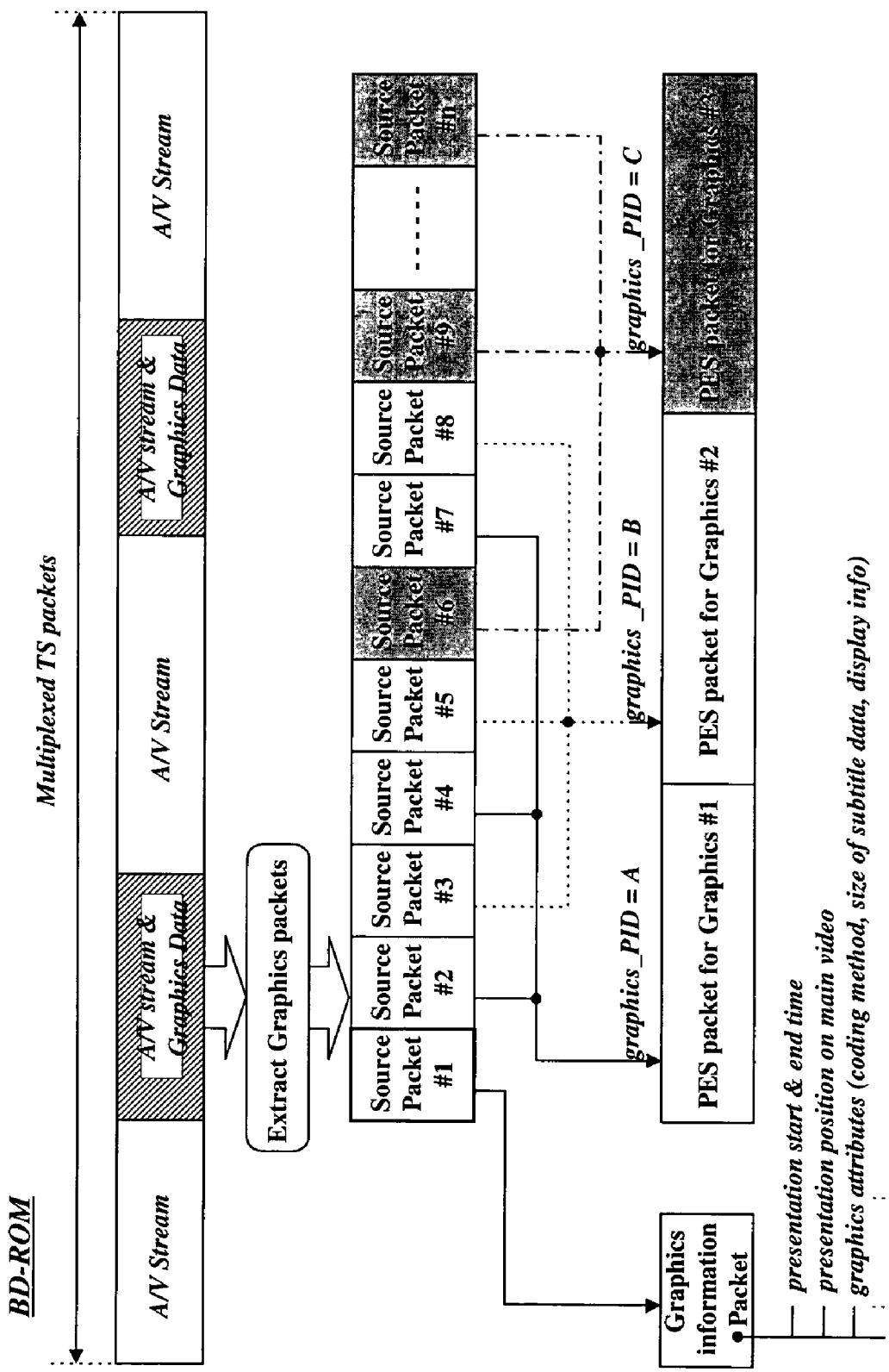
FIG. 6 illustrates a graphical representation of an A/V stream including multiple graphics streams structured and managed according to an embodiment of the present invention.

A high-density optical disk, for example, a Blu-Ray ROM (BD-ROM), BD-RE, etc. in accordance with the invention may have a file or data structure for managing reproduction of video and audio data as shown in FIG. 6.

Figure 1:
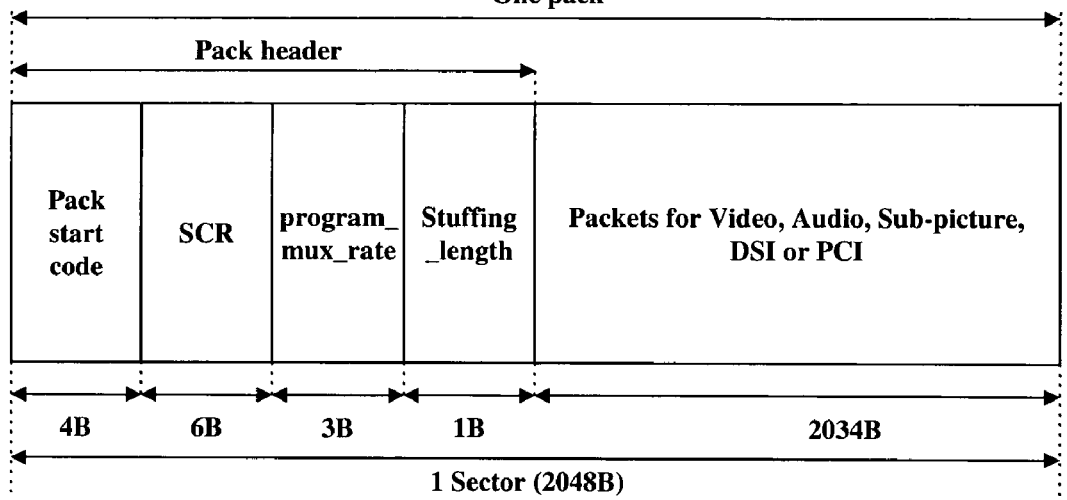
FIG. 1 is a diagram illustrating the data pack structure of a DVD-ROM.
Figure 2:
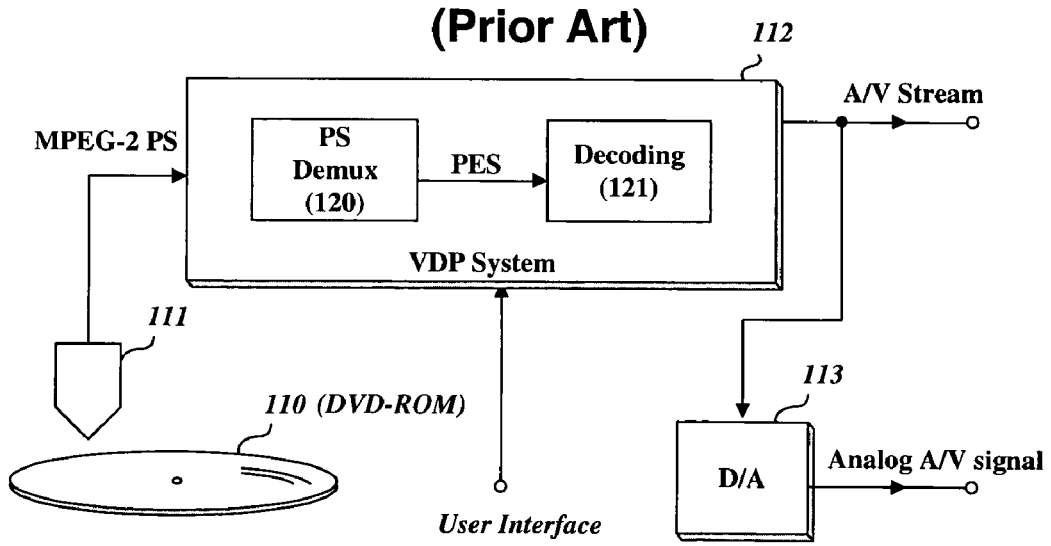
FIG. 2 is a diagram illustrating the structure of a DVD player reading out data recorded in a DVD-ROM.
Figure 3:
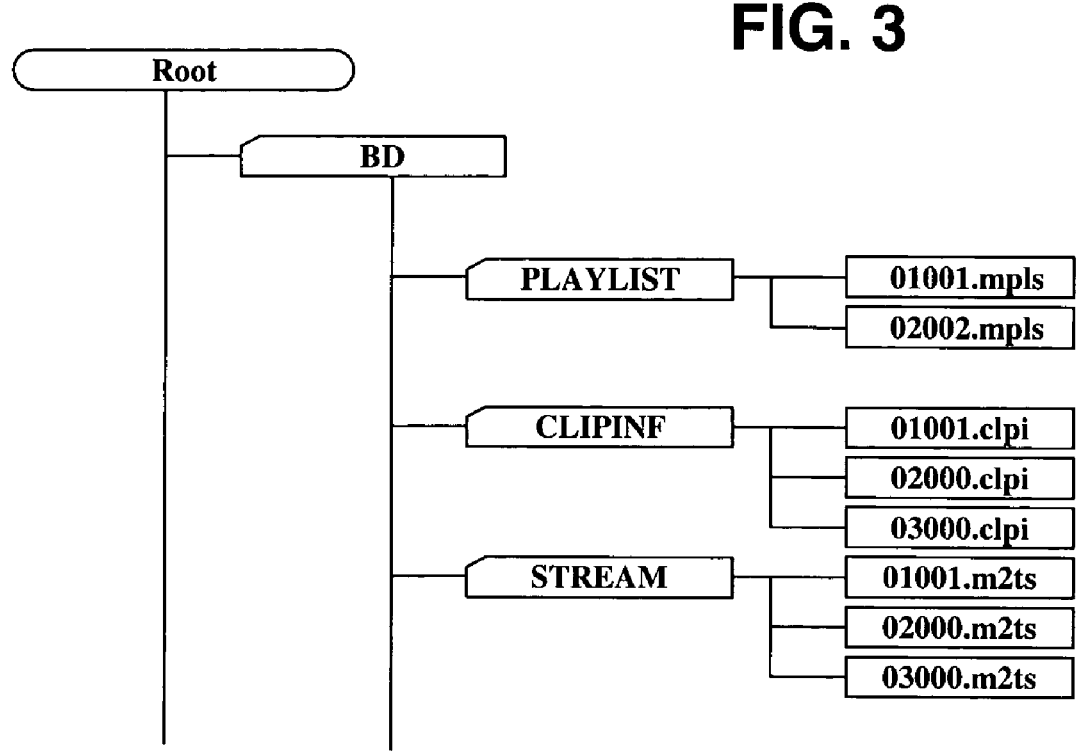
FIG. 3 illustrates an exemplary embodiment of a recording medium file or data structure according to the present invention.

As shown in FIG. 3, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID).

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID (s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the A/V stream; namely, the PTS and its related SPN point to an entry point on the A/V stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

The general information files (not shown) provide general information for managing the reproduction of the A/V streams recorded on the optical disk.

Figure 4:
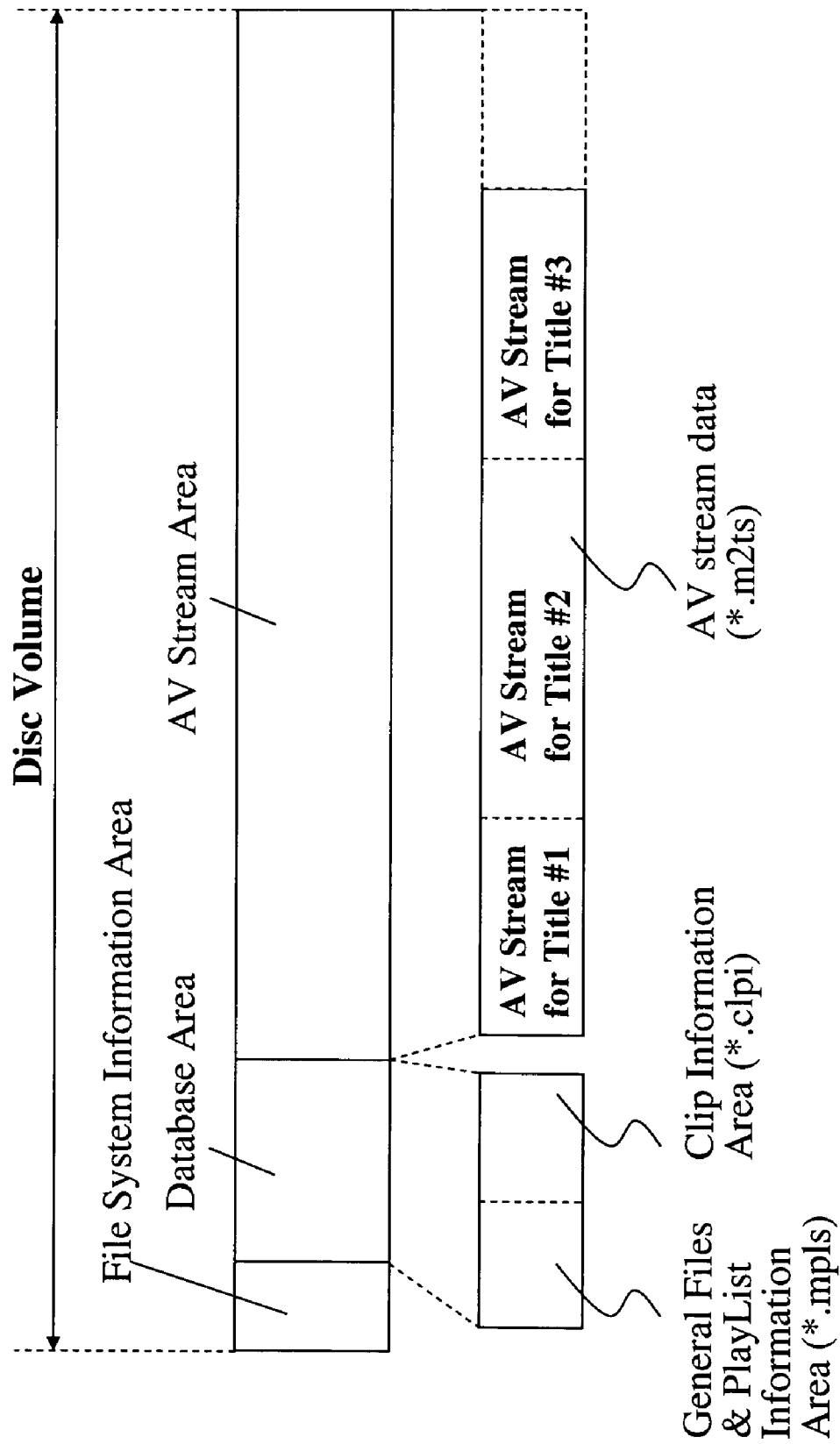
FIG. 4 illustrates an example of a recording medium having the data structure of FIG. 3 stored thereon.

In addition to illustrating the data structure of the recording medium according to an embodiment of the present invention, FIG. 3 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 4 illustrates an example of a recording medium having the data structure of FIG. 3 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data. Similarly, the different audio data available (e.g., different languages, director's commentary, audio coding formats, etc.) provide different audio streams for reproduction. Optical disks of high density also provide the opportunity to have multiple graphic or sub-picture streams recorded thereon and reproduced therefrom. Graphics streams include subtitles, menus, images, etc. For example, subtitles of different languages may be recorded as different graphic streams. Typically, a graphics stream is reproduced along with associated video and/or audio data and, for example, overlaid on the associated video.

The data structure for managing reproduction of multiple graphics streams for a high-density optical disk in accordance with embodiments of the present invention will be described along with methods and apparatuses according to embodiments of the present invention for recording and reproducing multiple graphics streams.

As discussed above, the CLIPINF directory includes a clip information file associated with each A/V stream file, and a clip information file includes a program information field. FIG. 5 illustrates portions of the structure of a program information field recorded on an optical disc according to an embodiment of the present invention. As shown, a length field indicates a length of the program information field, and a reserved_for_word_align field is reserved for future use. Next, a number of program sequences is indicated by the number_of_program_sequences field. As discussed above, a program sequence is associated with a segment of, for example, a video, audio and/or graphics presentation. For each program sequence i, the program information field provides at least the fields of: SPN_program_sequence_start[i], program_map_PID[i], graphics_PID[i][stream_index], graphicsCodingInfo(i, stream_index), and graphicsDisplayInfo(i, stream_index).

The SPN_program_sequence_start[i] field indicates a source packet number of a source packet where the ith program sequence starts in the A/V stream file. The program_map_PID[i] field indicates the value of the PID of the transport packets that shall contain the program map section applicable for the ith program sequence. The graphic_PID[i][stream_index] field indicates the PID value of each graphic stream in the ith program sequence. The graphicCodingInfo(i,stream_index) field indicates the coding format or method of coding each graphics stream in the ith program sequence. The graphicsDisplayInfo(i, stream_index) field indicates various display information for each graphics stream in the ith program sequence. For example, the display information may include display start and end information, display position information about the corresponding graphics data, size information, etc.

The graphics_PID field may be used in several different ways. As discussed above, graphics stream may be a subtitle, menu, image, etc. Each graphics stream may be differentiated from another using the graphics_PID value. Namely, according to the present invention, the transport packets of a graphics stream have a same graphics_PID, and different graphics streams have different graphics_PIDs.

FIG. 6 illustrates a graphical representation of an A/V stream including multiple graphics streams structured and managed according to an embodiment of the present invention. As shown, transport packets for multiple graphics streams are divided into groups and the groups are multiplexed with groups of the other A/V stream transport packets (e.g., video and/or audio transport packets). Within a group of graphic stream packets, the packets for different graphics streams are multiplexed. As shown, each graphics stream includes transport packets having a same graphics_PID, and the different graphics streams have different graphics_PIDs. Specifically, FIG. 6 shows the source packets, but as discussed above, a source packet is comprised of a header and a transport packet.

FIG. 6 shows first-third graphic streams #1-#3 in a group. The transport packets of the first graphics stream #1 each have a graphic_PID value of 'A', the transport packets of the second graphics stream #2 each have a graphic_PID value of 'B', and the transport packets of the third graphics stream #3 each have a graphic_PID value of 'C'.

FIG. 6 further shows that in one exemplary embodiment, a group of graphic stream packets begins with a graphics information packet. The graphics information packet may include the same graphics coding and display information supplied by the program information field regarding the graphics streams in the associated group of graphic stream packets.

Figure 7:
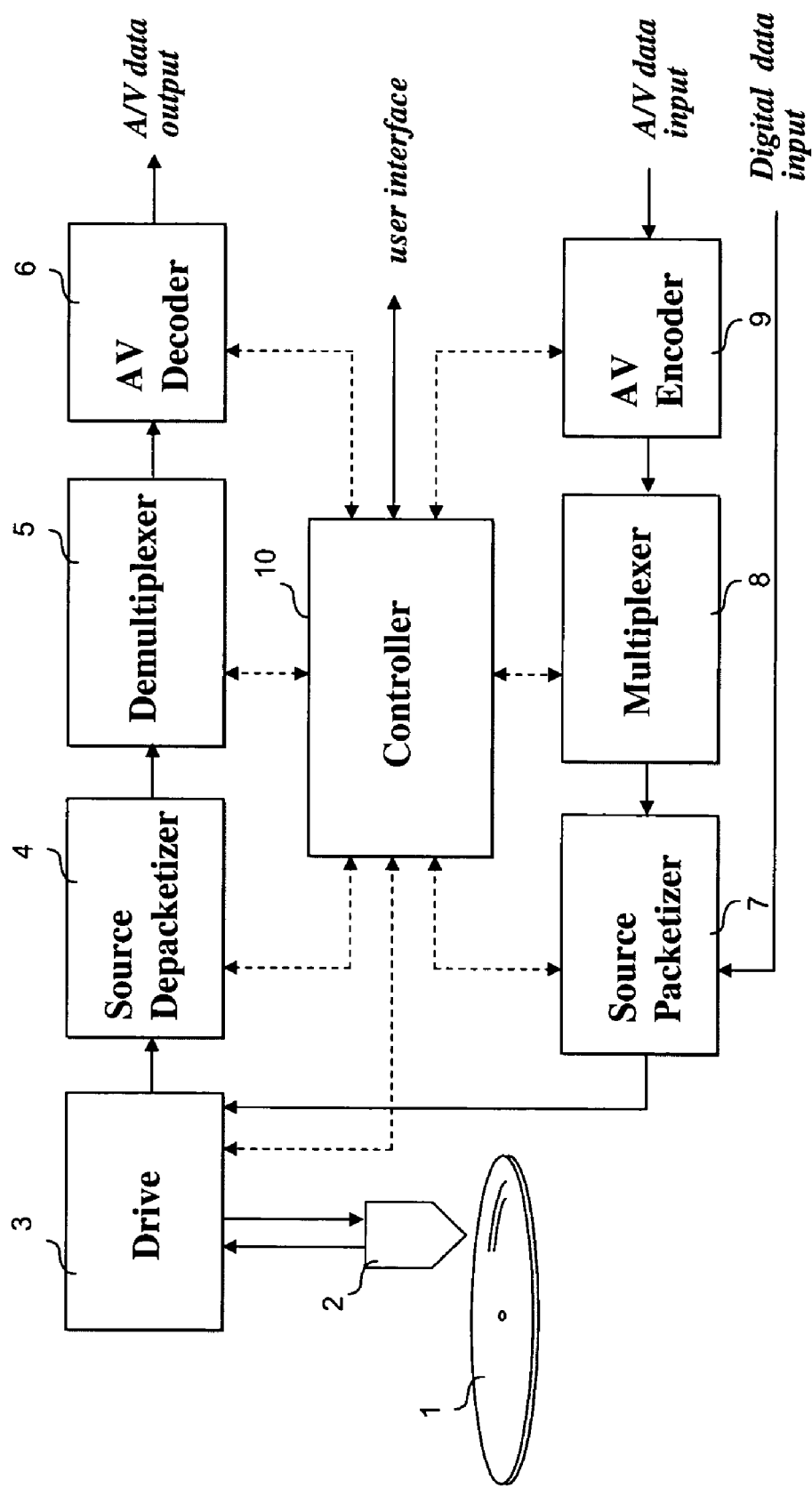
FIG. 7 is a diagram illustrating the structure of an optical disc apparatus where the present invention is applied.

FIG. 7 illustrates a schematic diagram of an embodiment of an optical disk recording and reproducing apparatus according to the present invention. As shown, an AV encoder 9 receives and encodes data (e.g., movie video, audio, graphics, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 3-6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

When multiple graphics streams are recorded in a data area of the BD-ROM, the controller 10 checks the characteristic packet ID (graphics_PID) recorded in each graphics packet.

Next, graphics packets having packet IDs corresponding to a graphics stream selected by a user via the user interface (e.g., subtitle of a particular language) are routed to the AV decoder 6 by the demultiplexer 5 under the control of the controller 10.

The controller 10 also searches for and checks the corresponding graphics coding information (graphicsCodingInfo) and graphic display information (graphicsDisplayInfo) in the program information field or graphics information packet and instructs the decoder 6 to perform decoding and display operations according to the coding format and display information designated by the graphics coding and display information. For example with reference to FIG. 6, if the first graphics stream is a subtitle data for the English language and this subtitle stream is selected for display by the user, the optical disk recording and reproducing apparatus reproduces source packets #2, #4, #7, etc., having transport packets with a graphics_PID value of 'A", which corresponds to the selected graphics stream.

While FIG. 7 has been described as a recording and reproducing apparatus, it will be understood that only a recording or only a reproducing apparatus may be provided using those portions of FIG. 7 providing the recording or reproducing function.

As will be appreciated from the forgoing disclosure, the present invention provides a recording medium having a data structure for managing multiple graphics streams recorded on a high-density recording medium (e.g., a high-density optical disk such as a BD-ROM).

As apparent from the above description, the present invention provides methods and apparatuses for recording a data structure on a high density recording medium for managing multiple graphics streams recorded on the recording medium.

The above description further provides methods and apparatus for reproducing multiple graphics streams recorded on a high density recording medium based on a data structure, also recorded on the high density recording medium, for managing the reproduction of the multiple graphics streams.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disc having a data structure for managing reproduction of a plurality of graphics streams, the optical disc comprising:
    a data area storing a stream file in which an A/V stream includes a plurality of source packets, each of the source packets having a packet identifier and being interleaved among the source packets according to the packet identifier, and the source packets having a same packet identifier defining a graphics stream of the plurality of graphics streams, the source packets forming at least one program sequence that is a sequence of the source packets in which the contents of a program is constant; and
    a management area storing a clip information file associated with the stream file, the clip information file including a program information field, the program information field including,
        program map packet identifier (PID) information indicating the value of the PID of source packets that contain a program map section applicable for the program sequence, and
        graphics PID information indicating the packet identifier for each of the plurality of graphics streams.

2. The optical disc of claim 1, wherein the program information field further includes coding format information indicating a coding format of the plurality of graphics streams.

3. The optical disc of claim 1, wherein the program information further includes display information for each of the plurality of graphics streams.

4. A method of reproducing a data structure for managing reproduction of a plurality of graphics streams from an optical disc, the method comprising:
    reading a clip information file associated with a stream file including an A/V stream and the plurality of graphic streams from the optical disc, the clip information file including a program information field,
    the program information field including,
        program map packet identifier (PID) information indicating the value of the PID of source packets that contain the program map section applicable for a program sequence, the program sequence being a sequence of source packets in which the contents of a program is constant, and
        graphics PID information indicating the packet identifier for each of the plurality of graphics streams; and
    reproducing a stream file in which an A/V stream includes a plurality of source packets, each of the source packets having a packet identifier and being interleaved among the source packets according to the packet identifier, and the source packets having a same packet identifier defining a graphics stream of the plurality of graphics streams.

5. The method of claim 4, wherein the program information field identifies the plurality of graphics streams based on the packet identifier.

6. The method of claim 4, wherein the program information field further includes a coding format information indicating a coding format of the plurality of graphics streams.

7. The method of claim 4, wherein the program information field further includes display information for the plurality of graphics streams.

8. An apparatus for reproducing a data structure for managing reproduction of a plurality of, graphics streams from an optical disc, the apparatus comprising:
    a pickup configured to reproduce data recorded on the optical disc; and
    a controller configured to control the pickup to reproduce a stream file in which an A/V stream includes a plurality of source packets, each of the source packets having a packet identifier and being interleaved among the source packets according to the packet identifier, and the source packets having a same packet identifier defining a graphics stream of the plurality of graphics streams, the source packets forming at least one program sequence that is a sequence of the source packets in which the contents of a program is constant,
    wherein the controller is further configured to control the pickup to reproduce a clip information file associated with an A/V stream and the plurality of graphics streams from the optical disc, the clip information file including a program information field, the program information field including,
        program map packet identifier (PID) information indicating the value of the PID of source packets that contain the program map section applicable for the program sequence, and
        graphics PID information indicating the packet identifier for each of the plurality of graphics streams.

9. The apparatus of claim 8, wherein the controller identifies the plurality of graphics streams based on the packet identifier included in the graphics PID information.

10. The apparatus of claim 8, wherein the controller is further configured to control the pickup to read coding format information indicating a coding format of the plurality of graphics streams, included in the program information field.

11. The apparatus of claim 8, wherein the controller is further configured to control the pickup to read display information of the plurality of graphics streams, included in the program information field.

12. A method of recording a data structure for managing reproduction of a plurality of graphics streams on an optical disc, the method comprising:

recording a stream file in which an A/V stream includes a plurality of source packets, each of the source packets having a packet identifier and being interleaved among the source packets according to the packet identifier, and the source packets having a same packet identifier defining a graphics stream of the plurality of graphics streams, the source packets forming at least one program sequence that is a sequence of the source packets in which the contents of a program is constant; and recording a clip information file associated with an A/V stream and the plurality of graphics steams in the optical disc, the clip information file including a program information field, the program information field including, program map packet identifier (PID) information indicating the value of the PID of source packets that contain a program map section applicable for the program sequence, and graphics PID information indicating the packet identifier for each of the plurality of graphics streams.

13. The method of claim 12, wherein the program information field identifies the plurality of graphics streams based on the packet identifier.

14. The method of claim 12, wherein the program information field includes a coding format information indicating a coding format of the plurality of graphics streams.

15. The method of claim 12, wherein the program information field includes display information the plurality of graphics streams.

16. An apparatus for recording a data structure for managing reproduction of a plurality of graphics streams on an optical disc, the apparatus comprising:

a pickup configured to record data on the optical disc; and a controller configured to control the pickup to record a stream file in which an A/V stream includes a plurality of source packets, each of the source packets having a packet identifier and being interleaved among the source packets according to the packet identifier, and the source packets having a same packet identifier defining a graphics stream of the plurality of graphics streams, the source packets forming at least one program sequence that is a sequence of the source packets in which the contents of a program is constant, wherein the controller is further configured to control the pickup to record a clip information file associated with the stream file in the optical disc, the clip information file including a program information field, the program information field including, program map packet identifier (PID) information indicating the value of the PID of source packets that contain a program map section applicable for the program sequence, and graphics PID information indicating the packet identifier for each of the plurality of graphics streams.

17. The apparatus of claim 16, wherein the controller identifies the plurality of graphics streams based on the packet identifier included in the graphics PID information.

18. The apparatus of claim 16, wherein the controller is further configured to control the pickup to record a coding format information indicating a coding format of the plurality of graphics streams in the program information field.

19. The apparatus of claim 16, wherein the controller is further configured to control the pickup to record display information of the plurality of graphics streams in the program information field.

* * * * *